(12) United States Patent
Behrens et al.

(10) Patent No.: US 8,191,616 B2
(45) Date of Patent: Jun. 5, 2012

(54) COMBINED THERMAL PROTECTION AND SURFACE TEMPERATURE CONTROL SYSTEM

(75) Inventors: William W. Behrens, St. Louis, MO (US); Andrew R. Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 970 days.

(21) Appl. No.: 12/182,844

(22) Filed: Jul. 30, 2008

(65) Prior Publication Data

US 2010/0038051 A1  Feb. 18, 2010

Related U.S. Application Data

(63) Continuation-in-part of application No. 11/556,138, filed on Nov. 2, 2006.

(51) Int. Cl.
*B60H 1/00* (2006.01)
*F28F 7/00* (2006.01)
(52) U.S. Cl. .......... 165/168; 165/41; 165/80.4; 165/908
(58) Field of Classification Search .............. 165/41, 165/80.3, 80.4, 104.33, 185
See application file for complete search history.

(56) References Cited

U.S. PATENT DOCUMENTS

| | | | | |
|---|---|---|---|---|
| 4,151,800 A * | 5/1979 | Dotts et al. | ........ | 244/159.1 |
| 4,222,434 A * | 9/1980 | Clyde | ........ | 165/10 |
| 5,205,353 A * | 4/1993 | Willemsen et al. | ........ | 165/170 |
| 6,512,292 B1 * | 1/2003 | Armbrust et al. | ........ | 257/712 |
| 2002/0108743 A1 * | 8/2002 | Wirtz | ........ | 165/185 |
| 2003/0161104 A1 * | 8/2003 | Hartzell et al. | ........ | 361/699 |
| 2004/0038029 A1 * | 2/2004 | Zinn et al. | ........ | 428/375 |
| 2004/0245389 A1 * | 12/2004 | Behrens et al. | ........ | 244/117 A |

* cited by examiner

*Primary Examiner* — Frantz F. Jules
*Assistant Examiner* — Henry Crenshaw

(57) ABSTRACT

The invention relates to a combined thermal protection and surface temperature control apparatus. In one embodiment, a combined thermal protection and surface temperature control apparatus comprises a porous member having an entrance side, a separate exit side, and a plurality of thermally conductive plugs disposed in the porous member. One or more coolant entrance channels extend through the entrance side, extend part-way through the porous member, and end within the porous member before reaching the exit side. Conversely, one or more coolant exit channels begin within the porous member, extend through a portion of the porous member, and extend through the exit side. The coolant entrance and exit channels may be parallel and may alternate. The channels may only extend across a portion of the thickness of the porous member.

39 Claims, 8 Drawing Sheets

Pressure Drop Comparison

|  | BN | AlN | $Al_2O_3$ |
|---|---|---|---|
| THERMAL CONDUCTIVITY BTU/hr-ft-°@77°F | 175+ | 150 | 20 |
| THEORETICAL DENSITY ($lb/ft^3$) | 140 | 204 | 249 |
| COEFFICIENT OF LINEAR EXPANSION, x $10^{-6}$/°C | <1 | 4.4 | 6.7 |

FIG.10

COMBINED THERMAL PROTECTION AND SURFACE TEMPERATURE CONTROL SYSTEM

CROSS-REFERENCE TO RELATED APPLICATIONS

This application is a continuation-in-part of published U.S. utility application Ser. No. 11/556,138 (Pub. No. US 2008/0105402 A1), filed Nov. 2, 2006, entitled "Combined Thermal Protection and Surface Temperature Control System", currently pending, and which is incorporated herein by reference in its entirety. This application is related to copending U.S. utility application Ser. No. 12/108,940, filed Apr. 24, 2008, entitled "High Conductivity Ceramic Foam Cold Plate", which is a continuation-in-part of U.S. utility application Ser. No. 11/407,438, filed Apr. 20, 2006, entitled "Ceramic Foam Cold Plate", which are both incorporated herein by reference in their entireties. This application is also related to copending U.S. utility application Ser. No. 11/407,438, filed Dec. 15, 2006, entitled "Hybrid Ceramic Core Cold Plate", which is a continuation-in-part of U.S. utility application Ser. No. 11/407,438, filed Apr. 20, 2006, entitled "Ceramic Foam Cold Plate", which are both incorporated herein by reference in their entireties.

BACKGROUND OF THE INVENTION

There are a number of thermal control problems which may arise in high heat flux environments, such as those encountered in air breathing engines, during hypersonic flight of aircraft, or in other non-aeronautical applications. The first problem concerns protecting the underlying airframe structure from destruction by the high heat flux via a thermal protection system (TPS). The other problem concerns controlling the temperature of a surface bounding a high velocity flow to a particular level, while that surface is simultaneously being subjected to high heat flux.

Back side cooling, film cooling, and transpiration cooling methods may all potentially deal with both problems in a single design, but may have significant drawbacks. For instance, they may require high coolant flow rates and may depend on the delivery of coolant to be cooled through a heavy, expensive, structural ducting and plenum system. A plenum may have to be provided directly behind any area which requires cooling. A further drawback of film cooling systems may be the expense associated with drilling large numbers of small holes in the surface to be cooled. Transpiration systems may be limited by the ceramic and sintered metal porous materials used for the surface to be cooled. Ceramics may be brittle and may lack structural strength when unsupported by a substrate. Sintered metals may be heavy and expensive.

Some of the prior ceramic foam TPS systems have the foam bonded to the structural member requiring cooling. Coolant may flow through the foam in the plane of the structural member being cooled so that the foam itself becomes the plenum for the cooling air. This method may work well as a TPS system, protecting the bond line with a much smaller amount of coolant than the traditional methods discussed above. However, achieving surface temperature control with this system may be difficult because the pressure loss in the coolant may become prohibitive at the coolant flow rates needed to maintain a given surface temperature.

Other prior art TPS systems may use ceramic foam bonded to a structural plenum. This system may provide good surface temperature control, and may also function as a TPS system. However, it may share a fundamental drawback with the traditional methods previously mentioned. Namely, it may employ a heavy, expensive, structural plenum for delivery of coolant to the surface.

A combined thermal protection and surface temperature control apparatus, and method for its manufacture and use, is needed which may solve or reduce one or more problems associated with one or more of the prior art apparatus.

SUMMARY OF THE INVENTION

In one aspect of the invention, a combined thermal protection and surface temperature control apparatus comprises a porous member comprising an entrance side, and a separate exit side. One or more coolant entrance channels extend through the entrance side, extend part-way through the porous member, and end within the porous member before reaching the exit side. One or more coolant exit channels begin within the porous member, extend through a portion of the porous member, and extend through the exit side.

In another aspect of the invention, a thermally protected, controlled surface temperature apparatus comprises a member requiring thermal protection, and a porous member comprising an attachment side, a separate entrance side, and a separate exit side. One or more coolant entrance channels extend through the entrance side, extend part-way through the porous member, and end within the porous member before reaching the exit side. One or more coolant exit channels begin within the porous member, extend through a portion of the porous member, and extend through the exit side. The attachment side of the porous member is attached to the member.

In a further aspect of the invention, a method of manufacturing a thermal protection, controlled surface temperature apparatus comprises providing a porous member, and manufacturing coolant entrance and exit channels within the porous member. The coolant entrance channel only extends through one side of the porous member, and the coolant exit channel only extends through another side of the porous member.

In a further aspect of the invention, there is provided a combined thermal protection and surface temperature control apparatus comprising: a porous member comprising an entrance side, and a separate exit side, wherein said porous member has a plurality of thermally conductive plugs disposed in said porous member; one or more coolant entrance channels extending through said entrance side, extending part-way through said porous member, and ending within said porous member before reaching said exit side; and one or more coolant exit channels beginning within said porous member, extending through a portion of said porous member, and extending through said exit side.

In a further aspect of the invention, there is provided a thermally protected, controlled surface temperature apparatus comprising: a member requiring thermal protection; a porous member comprising an attachment side, a separate entrance side, and a separate exit side, wherein said attachment side of said porous member is attached to said member, and further wherein said porous member has a plurality of thermally conductive plugs disposed in said porous member; one or more coolant entrance channels extending through said entrance side, extending part-way through said porous member, and ending within said porous member before reaching said exit side; and one or more coolant exit channels beginning within said porous member, extending through a portion of said porous member, and extending through said exit side.

In a further aspect of the invention, there is provided a method of manufacturing a thermal protection, controlled surface temperature apparatus comprising: providing a porous member wherein said porous member has a plurality of thermally conductive plugs disposed in said porous member; and manufacturing coolant entrance and exit channels within said porous member, wherein said coolant entrance channel only extends through one side of said porous member and said coolant exit channel only extends through another side of said porous member.

These and other features, aspects and advantages of the invention will become better understood with reference to the following drawings, description and claims.

BRIEF DESCRIPTION OF THE DRAWINGS

FIG. 10 is a chart showing the material properties for the preferred thermally conductive plug materials.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
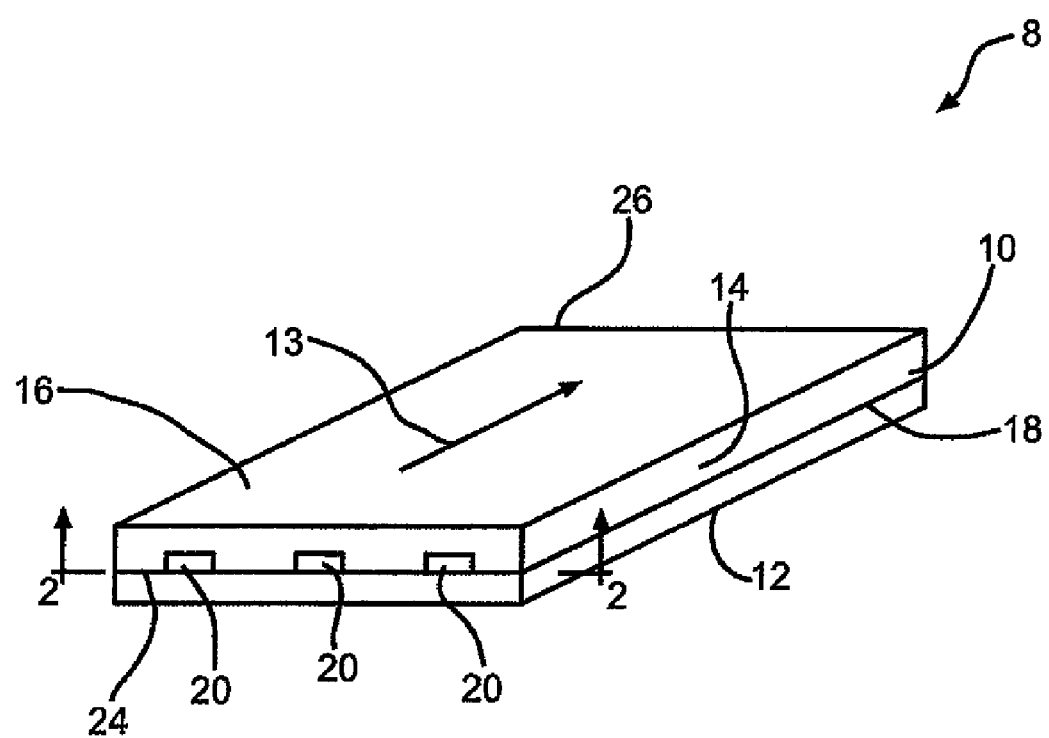
FIG. 1 is a perspective view of a thermally protected apparatus under one embodiment of the invention.

In one embodiment of the invention, as depicted in FIG. 1, a thermally protected, surface temperature controlled apparatus 8 is provided. The thermally protected and surface temperature controlled apparatus 8 may comprise a thermal protection apparatus 10 which has an attachment side 18 which is attached, utilizing a RTV silicone adhesive, to a member 12 to which it is providing thermal protection from an environment hot flow 13. In other embodiments, the thermal protection apparatus 10 may be attached to the thermally protected member 12 utilizing any type of attachment mechanism. The thermally protected member 12 may comprise any type of surface which requires thermal protection, such as a portion of an engine, a portion of a vehicle, a portion of an aircraft, a portion of a spacecraft, and/or other types of surfaces or devices. In still other embodiments, the thermal protection apparatus 10 may be provided on its own, and may be adapted to be attached to a member to provide thermal protection. For purposes of this application, it should be noted that the various provided embodiments may include and/or provide combined thermal protection and surface temperature control to the apparatus 8.

The thermal protection apparatus 10 may comprise a porous member 14. The porous member 14 may comprise a porous foam, such as a ceramic foam. In one embodiment, the porous foam may comprise a high porosity foam having the michrochannel pore sizes. The porous foam may comprise a hyperporous, microchannel, alumina silica foam that is lightweight having a density of approximately 16 pounds per cubic foot, a porosity in excess of 80 percent, and pores substantially in the size of 5 to 50 microns. Hyperporous refers to high porosity, which may in one embodiment be 90 percent porosity. Microchannel refers to the pore size, which in one embodiment may be 35 microns. In one embodiment, the foam may comprise a foam made by Boeing known as Boeing Rigid Insulation foam (BRI), which may be similar to the space shuttle thermal tile. This foam may have a density of 16 pounds per cubic foot, a porosity of approximately 90 percent, and pore size of approximately 35 microns. The combination of hyperporosity and very small pores provides a large internal surface area for convection of heat to a coolant flowing through the pores of the porous member 14. In other embodiments, the porous member 14 may comprise a multitude of varying materials, may have varying percentage porosity, may have differing density, may have varying size pores, and/or may have other properties, sizes, or configurations. A top side 16 of the porous member 14 may be coated with an erosion coating to substantially protect it from erosion by the environment hot flow 13.

Figure 2:
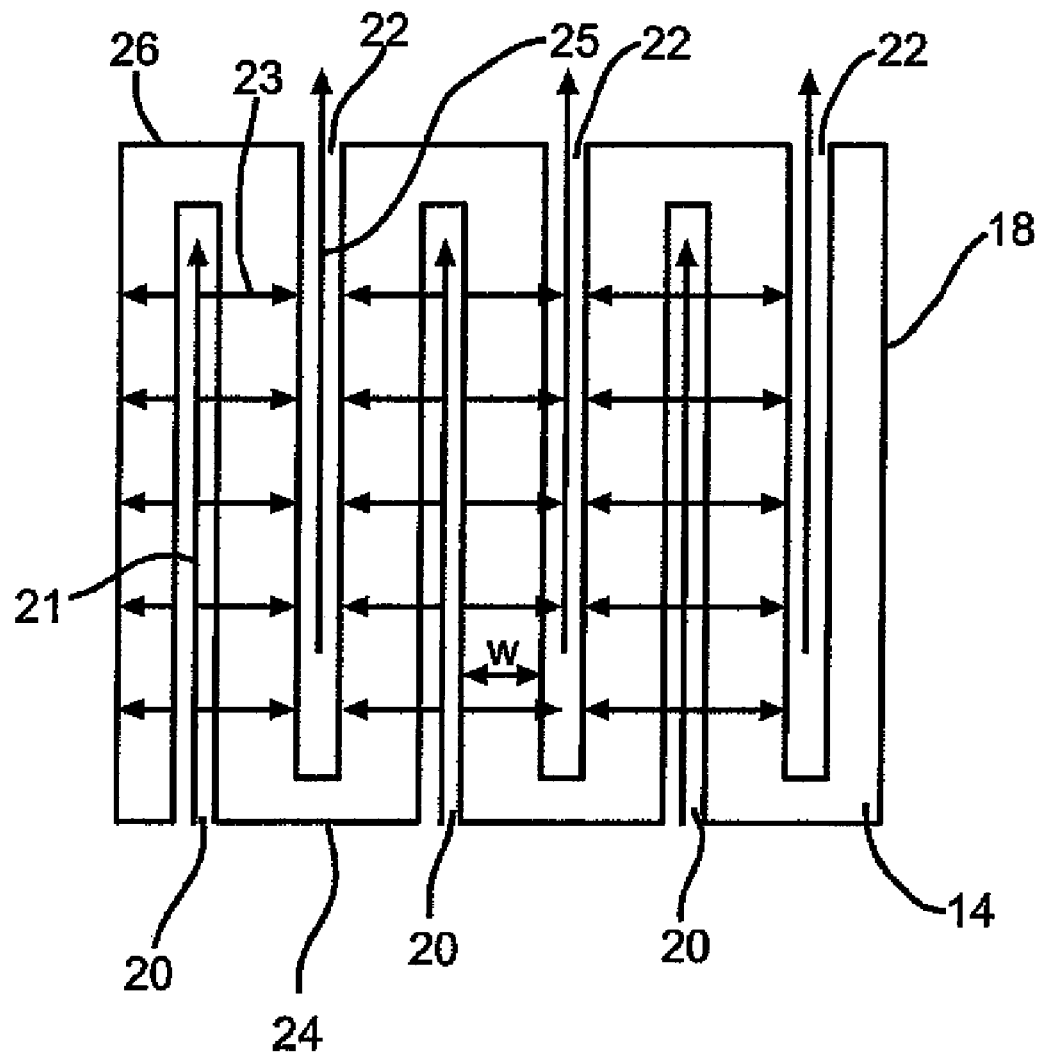
FIG. 2 is a cross-sectional view along line 2-2 of FIG. 1.

FIG. 2 depicts a cross-sectional view along line 2-2 in FIG. 1 showing the bottom attachment side 18 of the porous member 14 with the thermally protected member cut away. As shown in FIGS. 1 and 2, the thermal protection apparatus 10 may have a plurality of coolant entrance channels 20 which are parallel and alternate with respect to a plurality of coolant exit channels 22. The coolant entrance and exit channels 20 and 22 may be equidistant from one-another, or in other embodiments, may be in differing orientations and configurations. The coolant entrance channels 20 may extend through an entrance side 24 of the porous member 14, may extend part-way through the porous member 14, and may end within the porous member 14 prior to reaching an exit side 26 of the porous member 14. Conversely, the coolant exit channels 22 may begin within the porous member 14, may extend through a portion of the porous member 14, and may extend through the exit side 26 of the porous member 14. The coolant entrance and exit channels 20 and 22 may be machined in the porous member 14 or manufactured utilizing any process known in the art.

This arrangement of alternating, parallel, coolant entrance and exit channels 20 and 22, which do not independently span the entire length of the porous member, force coolant, in the form of a liquid or gas such as air, to flow through the entrance channels 20 in a parallel direction 21, through the pores of the porous member 14 in a generally perpendicular direction 23, and through the exit channels 22 in another parallel direction 25. This arrangement of channels 20 and 22, in combination with the relatively short distance that separates them, may provide a low pressure drop path for coolant to enter and exit the porous member 14. In other embodiments, any number of coolant entrance or exit channels 20 and 22 may be utilized in a variety of sizes, shapes, orientations, and/or configurations, extending through various portions of the porous member 14.

Figure 3:
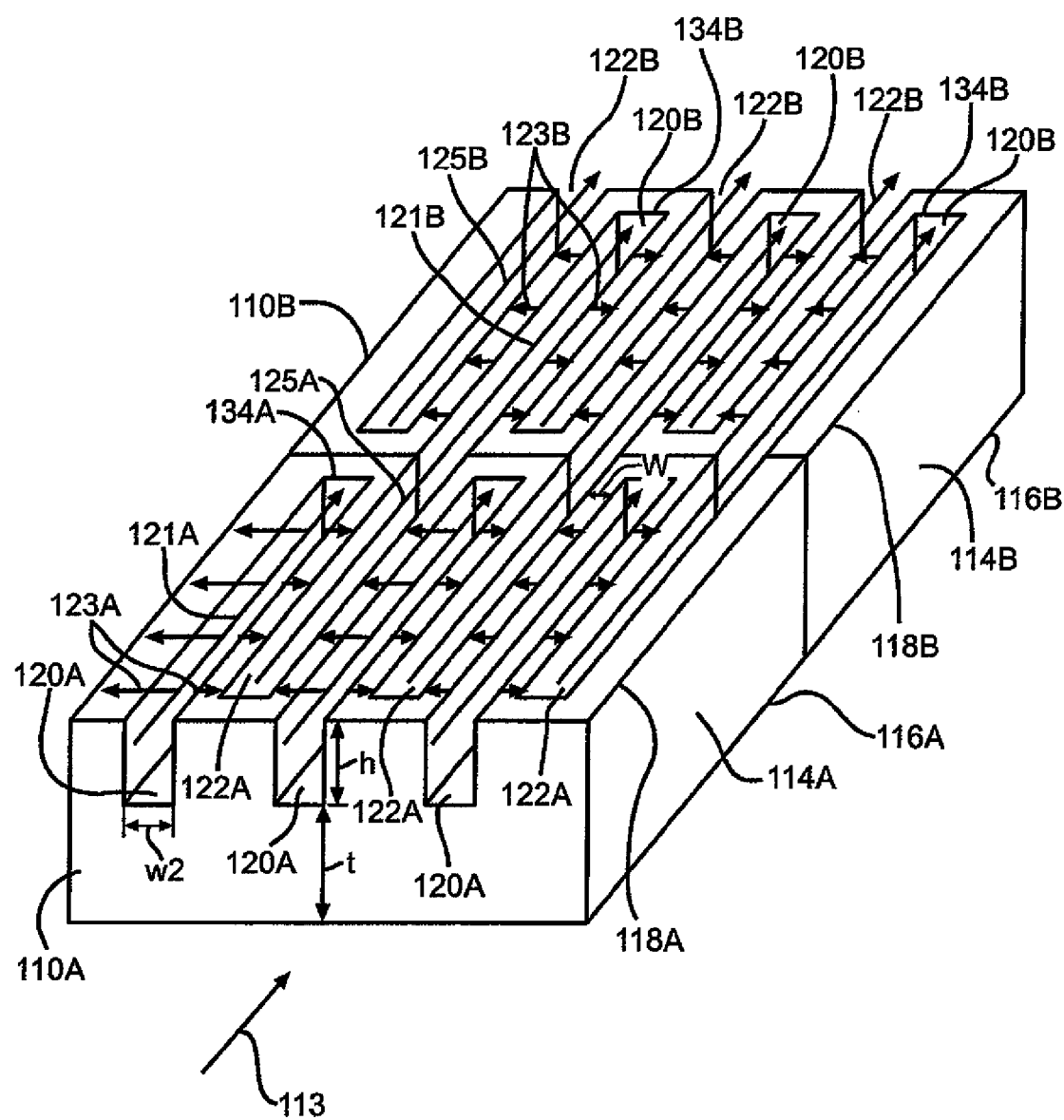
FIG. 3 is a perspective view of two thermal protection apparatus attached together under another embodiment of the invention.

FIG. 3 depicts a perspective bottom view of another embodiment of the invention showing the porous members 114A and 114B of two separate thermal protection apparatus 110A and 110B bonded together, with the thermally protected member removed from the attachment sides 118A and 118B of the porous members 114A and 114B. In other embodiments, any number of thermal protection apparatus 110 may be attached together utilizing differing types of attachment mechanisms. As shown in FIG. 3, the coolant entrance channels 120A of the first thermal protection apparatus 110A may be aligned with the coolant exit channels 122B of the second attached thermal protection apparatus 110B. Similarly, the coolant exit channels 122A of the first attached thermal protection apparatus 110A may be aligned with the coolant entrance channels 120B of the second attached thermal protection apparatus 110B.

When the bottom sides 118A and 118B of the thermal protection apparatus 110A and 110B are attached to a thermally protected member (not shown), a coolant may flow through the coolant entrance channels 120A of the first thermal protection apparatus 110A in a direction 121A. The coolant may comprise a gas and/or a liquid. In one embodiment, the coolant may comprise air. Since the coolant entrance channels 120A of the first thermal protection apparatus 110A may end in side-walls 134A, the coolant may be forced to flow in directions 123A generally perpendicular to the entrance channels 120A of the first protection apparatus 110A. The coolant may enter the coolant exit channels 122A of the first thermal protection apparatus 110A through the pores of the porous member 114A, and may flow in direction 125A through the coolant exit channels 122A of the first thermal protection apparatus 110A, and into the coolant entrance channels 120B of the second attached thermal protection apparatus 110B in direction 121B. Since the coolant entrance channels 120B of the second thermal protection apparatus 110B may end in side-walls 134B, the coolant may be forced to flow in directions 123B generally perpendicular to the coolant entrance channels 120B of the second thermal protection apparatus 110B. The coolant may enter the coolant exit channels 122B of the second thermal protection apparatus 110B through the pores of the porous member 114B, and may flow in direction 125B through the coolant exit channels 122B of the second thermal protection apparatus 110B, and may exit the coolant exit channels 122B and out of the second thermal protection apparatus 110B. In such manner, the coolant may be distributed throughout the first and second thermal protection apparatus 110A and 110B in order to provide thermal protection to an attached thermally protected member (not shown). In other embodiments, any number, alignment, size, type, configuration, and/or orientation of thermal protection apparatus and coolant entrance and exit channels may be utilized to provide thermal protection.

As shown in FIG. 3, in order to control the amount of surface temperature control provided to the member (to which the thermal protection apparatus will later be attached) requiring thermal protection, dimensions h, t, and w of each thermal protection apparatus 110A and 110B may be changed to achieve the desired result. The combination of these design variables may determine coolant pressure drop, hot side 116A and 116B cooling effectiveness and associated surface temperature, and porous member contact area on sides 118A and 118B to the bonding material attaching the member requiring thermal protection. Heat conducted into the solid matrix of the porous members 114A and 114B may be absorbed via convection by the coolant flowing through the pores of the porous members 114A and 114B. Increasing the thickness t of the portion of the porous members 114A and 114B capping the channels 120A and 120B and 122A and 122B may increase the hot side 116A and 116B surface temperatures, thereby resulting in decreased cooling effectiveness at surfaces 116A and 116B. This may occur because the thermal resistance between the hot flow 113 and the coolant may be increased. This increased thermal resistance may have the beneficial effect of decreasing the temperature at the attachment sides 118A and 118B, thereby increasing the thermal protection of the RTV used to bond the apparatus to the member requiring thermal protection.

Conversely, minimizing the thickness t of the portion of the porous members 114A and 114B capping the coolant channels 120A & B and 122A & B may increase the amount of cooling that occurs on the hot side 116A and 116B of the porous members 114A and 114B, thereby lowering the surface temperatures 116A & B and increasing the hot side cooling effectiveness. Increasing the distance w between channels 120A and 122A and between 120B and 122B may increase the distance the coolant travels through the porous members 114A and 114B which may drive up the coolant pressure drop, while decreasing w may have the opposite effect. Minimizing the height h of the channels 120A & B and 122A & B while maintaining the same channel flow area by increasing the width w2 of cooling channels 120A & B and 122A & B, may reduce the contact area between the porous members 114A and 114B and the bonding material attaching the member requiring thermal protection. In such manner, one or more of the dimensions h of the entrance and exit channels 120A & B and 122A & B, a spacing distance w between the entrance and exit channels, and another spacing distance t between the entrance and exit channels and surfaces 116A & B of the porous members may be predetermined based on the amount of thermal protection and surface temperature control required.

Figure 4:
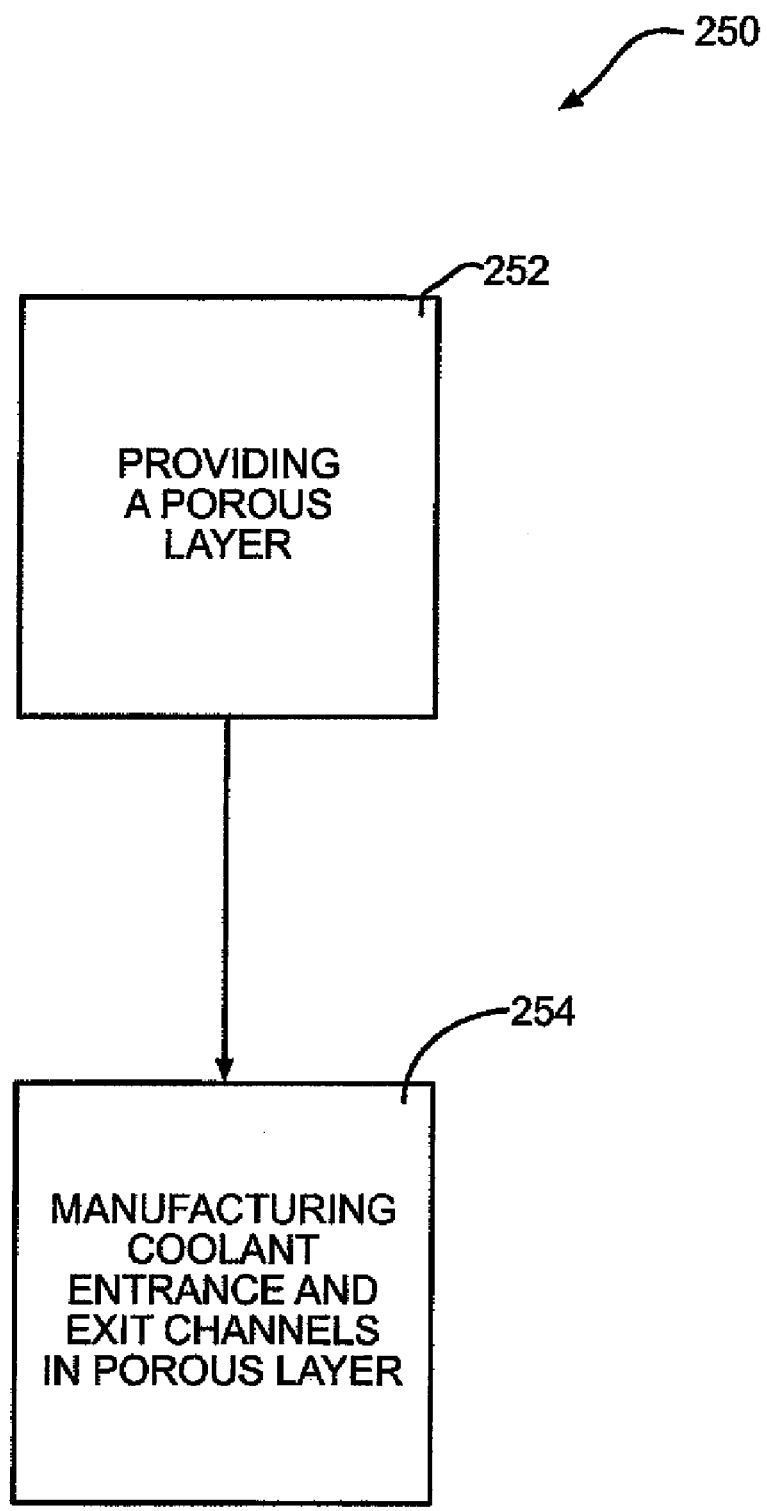
FIG. 4 depicts a method of manufacturing a thermal protection apparatus under another embodiment of the invention.

FIG. 4 depicts a method 250 of manufacturing a thermal protection apparatus. In one step 252, a porous member may be provided. The porous member may comprise a foam or other type of porous material. The foam may have high porosity with microchannel pore sizes, such as BRI foam. In another step 254, coolant entrance and exit channels may be manufactured within the porous member. The coolant entrance channel may only extend through one side of the porous member while the coolant exit channel may only extend through another side of the porous member. The coolant entrance and exit channels may be manufactured to be parallel and to alternate with respect to one another. In other embodiments, varying configurations and orientations may be utilized. Another step of the method may comprise determining a member which requires thermal protection. In one embodiment, this may comprise the first step of the method. The member may comprise a portion of an engine, a vehicle, an aircraft, a spacecraft, or any other type of member requiring thermal protection. Yet another step of the method may comprise determining at least one of a dimension of the entrance and exit channels, a spacing distance between the entrance and exit channels, and another spacing distance between the entrance and exit channels and a surface of the porous member, in order to provide the amount of thermal protection and surface temperature control required. An additional step of the method may comprise attaching the porous member to the member requiring thermal protection. In other embodiments, the method 250 may utilize any of the embodiments disclosed within this specification.

By advantageously utilizing the low thermal conductivity of the BRI along with its desirable cooling performance, surface cooling may be easily tailored. For instance, in an upstream section of one embodiment of the invention, the foam thickness above the channel t may be maximized. The low thermal conductivity of the foam may minimize the amount of heat the coolant absorbs in this region. Reducing the energy absorbed in this upstream region may increase the coolant thermal capacity available for heat absorption farther downstream in the apparatus. To maximize surface cooling in this downstream region, the foam thickness t may be at a minimum. Reducing the foam thickness t may increase the heat absorbed by the coolant which may lower the surface temperature.

Figure 7:
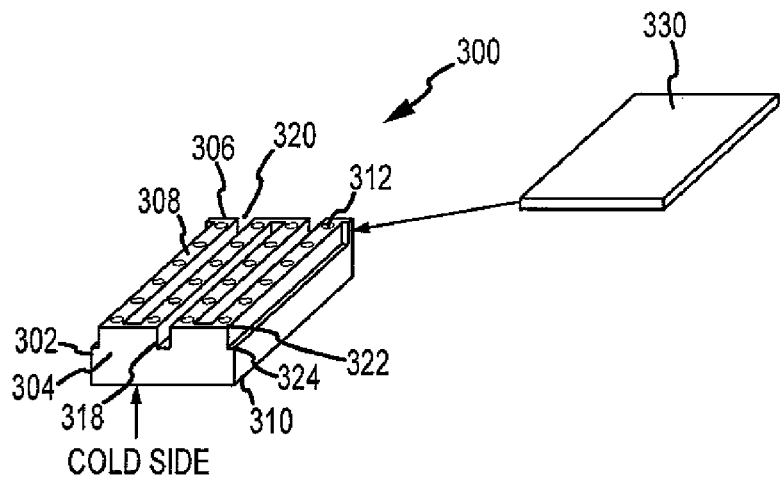
FIG. 7 is a partially exploded view of a combined thermal protection and surface temperature control apparatus of another embodiment of the invention.
Figure 8:
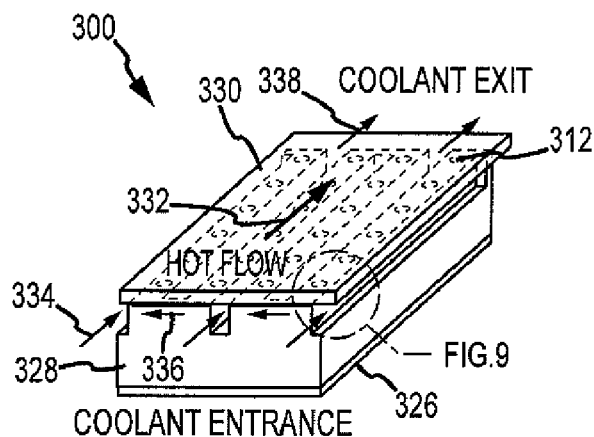
FIG. 8 is a perspective view of the combined thermal protection and surface temperature control apparatus of FIG. 7.
Figure 9:
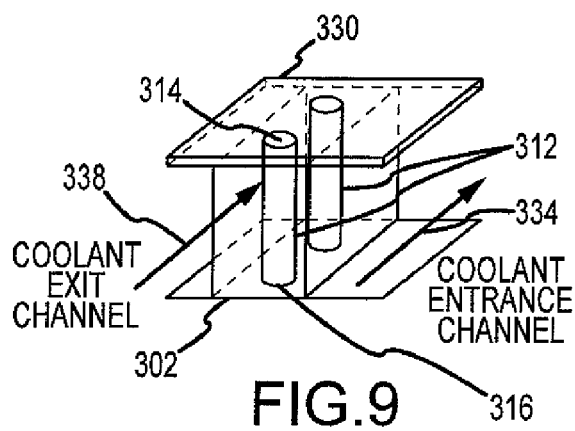
FIG. 9 is a cross-sectional view of circle FIG. 9 of FIG. 8.

FIGS. 7-9 show another embodiment of the invention which achieves significant surface cooling. FIG. 7 is a partially exploded view of another embodiment of a combined thermal protection and surface temperature control apparatus, also referred to as a thermally protected and surface temperature controlled apparatus. FIG. 8 is a perspective view of the combined thermal protection and surface temperature control apparatus of FIG. 7. FIG. 9 is a cross-sectional view of circle FIG. 9 of FIG. 8. In this embodiment, as shown in FIGS. 7-9, a combined thermal protection and surface temperature control apparatus 300 is provided. The apparatus 300 comprises a porous member 302 having an entrance side 304 and a separate exit side 306. The porous member has a top side 308 and a bottom or attachment side 310. The top side 308 is the hot side or hot flow side, and the bottom side is the cold side. The porous member 302 further comprises a plurality of thermally conductive plugs 312 disposed in the porous member 302. Each plug 312 has a top end 314 and a bottom end 316. The apparatus 300 further comprises one or more coolant entrance channels 318 extending through the entrance side 304, extending part-way through the porous member 302, and ending within the porous member 302 before reaching the exit side 306. The apparatus 300 further comprises one or more coolant exit channels 320 beginning within the porous member 302 extending through a portion of the porous member 302, and extending through the exit side 306. The channels 318, 320 have top ends 322 and bottom ends 324. As shown in FIG. 8, the apparatus 300 may further comprise a thermally protected member 326.

The porous member 302 may comprise a porous foam, such as a ceramic foam. In one embodiment, the porous foam may comprise a high porosity foam having michrochannel pore sizes. The porous foam may comprise a hyperporous, microchannel, alumina silica foam that is light-weight having a density of approximately 16 pounds per cubic foot, a porosity in excess of 80 percent, and pores substantially in the size of 5 to 50 microns. Hyperporous refers to high porosity, which may in one embodiment be 90 percent porosity. Microchannel refers to the pore size, which in one embodiment may be 35 microns. In one embodiment, the foam may comprise a foam made by Boeing known as Boeing Rigid Insulation foam (BRI), which may be similar to the space shuttle thermal tile. This foam may have a density of 16 pounds per cubic foot, a porosity of approximately 90 percent, and pore size of approximately 35 microns. The combination of hyperporosity and very small pores provides a large internal surface area for convection of heat to a coolant flowing through the pores of the porous member 302. In other embodiments, the porous member 302 may comprise a multitude of varying materials, may have varying percentage porosity, may have differing density, may have varying size pores, and/or may have other properties, sizes, or configurations.

As shown in FIGS. 7-8, the porous member 302 has an insulating portion 328, preferably of ceramic foam, between it and the thermally protected member 326, where the bottom side 310 is the cold side. The top side 308 or hot side experiences high heat flux in one of two ways. The top side 308 of the porous member 302 may be coated with a top erosion coating 330 to substantially protect it from erosion by environment hot flow 332. The erosion coating 330 may be laid over the top side 308 of the porous member 302 to form the hot side interface. The erosion coating 330 may comprise aluminum nitride over an alumina silica cloth or another suitable material. The erosion coating protects the porous member in the presence of high speed, high heat flux gas flow.

Figure 11:
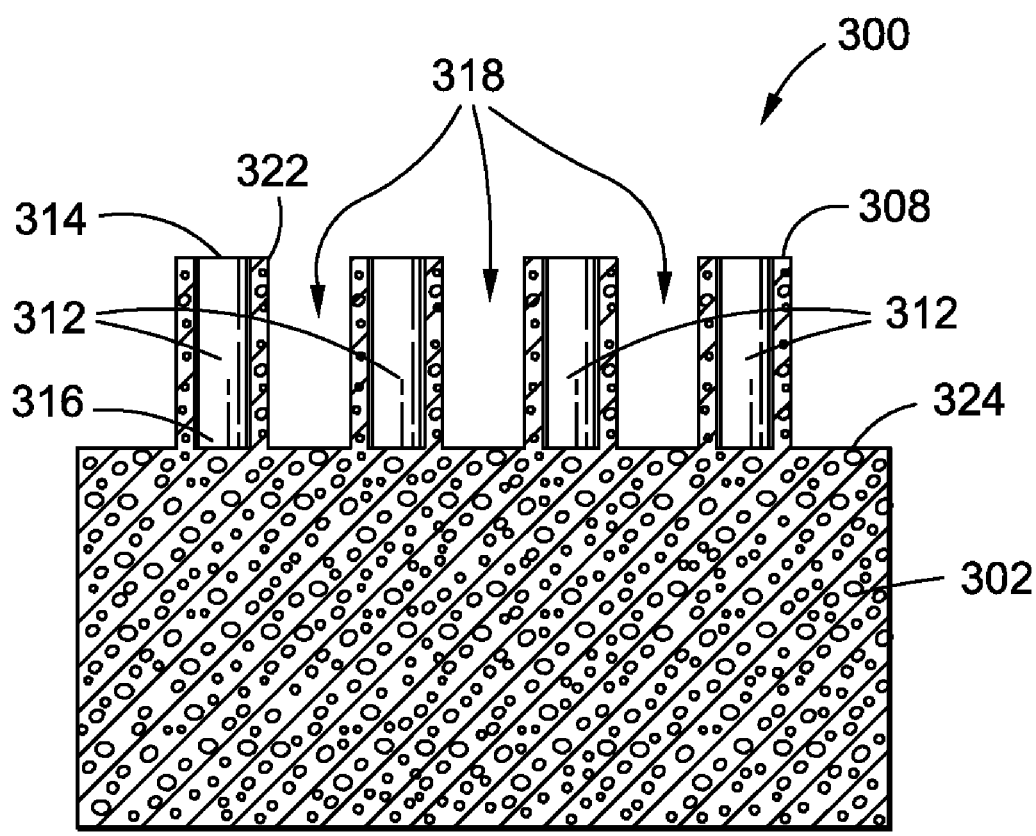
FIG. 11 is a front sectional view of the combined thermal protection and surface temperature control apparatus of FIG. 7.

The plurality of thermally conductive plugs 312, also referred to as high thermal conductivity plugs or slots, are disposed in the porous member 302. The plugs 312 are preferably disposed in the porous member 302 between the channels 318, 320 at regular intervals. The plugs 312 preferably extend from the top side 308 of the porous member 302 to a portion of the thickness of the porous member 302. More preferably, the bottom ends 316 of the plugs 312 end at a thickness of the porous member 302 equal to the bottom ends 324 of the channels 318, 320. FIG. 11 shows a front sectional view of the combined thermal protection and surface temperature control apparatus 300 of FIG. 7 and shows the porous member 302 with the top side 308, the plurality of thermally conductive plugs 312 each having the top end 314 and the bottom end 316, and the plurality of coolant entrance channels 318 each having the top end 322 and the bottom end 324. FIG. 11 shows the thermally conductive plugs 312 extending part-way through the porous member 302 from the top side 308 of the porous member 302 to a portion of a thickness of the porous member 302, the thermally conductive plugs 312 having bottom ends 316 ending at a depth or thickness equal to bottom ends 324 of the coolant entrance channels 318. When the top erosion coating 330 is placed or coated onto the top side 308 of the porous member 302, the top ends 314 of a the plugs 312 are in thermal communication with the top erosion coating 330. The plugs 312 transfer heat from the top of the porous member and/or from a portion along a partial thickness of the porous member into the porous member, that in turn, transfers heat to a provided coolant via convection. The plugs 312 thereby greatly improve the thermal efficiency of the porous member 302 in transferring heat to the coolant. In addition to improving thermal efficiency, the plugs 312 may provide structural support to the thermally protected and surface temperature controlled apparatus 300. In this exemplary embodiment as shown in FIGS. 7-9, the plugs 312 have a cylindrical geometry. However, in other alternative embodiments, the plugs 312 may be non-circular or may be replaced with square or rectangular slots that span a partial width of the porous member between the channels. In this exemplary embodiment, the plugs 312 may have a diameter (d) as large as 0.125 inch. However, in alternative embodiments, the plugs 312 may have any diameter (d) that provides the required thermal efficiency to the porous member 302 for the number of plugs 312 provided. The plugs 312 may be formed from a material having a high thermal conductivity to efficiently conduct heat. For example, highly conductive plugs 312 may be formed from such materials as boron nitride (BN), aluminum nitride (AlN), alumina ($Al_2O_3$) or another suitable material.

With respect to the channels 318, 320, the plurality of coolant entrance channels 318 are preferably parallel and alternate with respect to the plurality of coolant exit channels 320. As shown in FIG. 7, the channels 318, 320 are provided on the hot side of the porous member 302 in order to provide cooling closest to the hot side. The coolant entrance and exit channels 318, 320 may be equidistant from one another, or in other embodiments, may be in differing orientations and configurations. The coolant entrance channels 318 may extend through the entrance side 304 of the porous member 302, may extend part-way through the porous member 302, and may end within the porous member 302 prior to reaching the exit side 306 of the porous member 302. Conversely, the coolant exit channels 320 may begin within the porous member 302, may extend through a portion of the porous member 302, and may extend through the exit side 306 of the porous member 302. The coolant entrance and exit channels 318, 320 may be machined in the porous member 302 or manufactured utilizing any process known in the art. This arrangement of alternating, parallel, coolant entrance and exit channels 318, 320, which do not independently span the entire length of the porous member 302, force coolant, in the form of a liquid or gas such as air, to flow through the entrance channels 318 in a parallel direction 334, through the pores of the porous member 302 in a generally perpendicular direction 336, and through the exit channels 320 in another parallel direction 338. This arrangement of channels 318, 320, in combination with the relatively short distance that separates them, may provide a low pressure drop path for coolant to enter and exit the porous member 302. In other embodiments, any number of coolant entrance or exit channels 318, 320 may be utilized in a variety of sizes, shapes, orientations, and/or configurations, extending through various portions of the porous member 302. A plurality of combined thermal protection and surface temperature control apparatus 300 may be attached together, preferably via adhesive bonding.

With respect to the thermally protected member 326, the thermally protected member 326 may comprise any type of surface which requires thermal protection, such as a portion of an engine, a portion of a vehicle, a portion of an aircraft, a portion of a spacecraft, and/or other types of surfaces or devices. In still other embodiments, the apparatus 300 may be provided on its own, and may be adapted to be attached to the thermally protected member 326 to provide thermal protection. For purposes of this application, it should be noted that the various provided embodiments may include and/or provide combined thermal protection and surface temperature control to the apparatus 300. The thermally protected member 326 may be attached to the bottom or attachment side 310 of the porous member 302 with a room temperature vulcanizing (RTV) sealant such as a silicone adhesive or other suitable sealant. In other embodiments, the thermally protected member 326 may be attached to the porous member 302 utilizing any type of attachment mechanism.

The embodiment of the invention as shown in FIGS. 7-9, transfers heat in an extremely efficient manner with minimal coolant pressure drop from a high flux source by leveraging the high thermal conductivity of the plugs and/or slots to get the energy deep into a high internal surface area ceramic foam that has been formed into the porous member, which in turn, conveys the energy to a coolant via convection. This embodiment of the invention preferably uses hyperporous, microchannel BRI ceramic foam as an enhanced heat transfer material in combination with plugs and/or slots inserted into the foam where the plugs are made of high thermal conductivity, low $ electrical conductivity materials to make a combined thermal protection and surface temperature control apparatus for high heat flux applications where control of the interface temperature is important. This embodiment provides an apparatus that is lighter in weight and less expensive to construct while providing the same level of thermal protection with less coolant than known devices and systems. In particular, the use of the high conductivity plugs and/or slots requires far less coolant to control the heat flux interface temperature to a limiting value than is the case with known devices and systems.

The advantages of this embodiment of the invention are numerous. The ceramic foam acts as a cooling air plenum and the design is capable of controlling the hot side interface temperature, thus eliminating the need for heavy coolant supply plenums. The high efficiency of the combined thermal protection and surface temperature control apparatus means the underlying thermally protected member may be constructed from low temperature materials. By eliminating the plenums and utilizing polymer composite structure, engine component weight may be reduced by more than 50%. In addition to the weight savings, this embodiment provides cost savings, since with known designs, the underlying thermally protected member capable of withstanding high temperatures is expensive to design and fabricate, as are the structural plenums. In addition, this embodiment provides increased range and/or payload performance. Employing the thermally efficient hyperporous, microchannel, BN plugged ceramic foam as a thermal protection system significantly reduces the amount of cooling air needed in high speed flight applications, compared to known designs. When cooling for material survivability, testing has shown this embodiment of the invention reduces the required cooling air flow rate by two orders of magnitude. Reducing the air needed for thermal protection increases the air available for generating propulsive thrust, thus increasing range and/or payload. The combined thermal protection and surface temperature control apparatus preserves underlying airframe structures from destruction by high heat fluxes generated on the vehicle outer moldline (OML) and propulsion flow path during high speed flight. The apparatus ensures that the interface between the apparatus and the incident heat flux does not exceed a limiting temperature. Moreover, the apparatus minimizes the required coolant flow rate because this constitutes a penalty to an air vehicle. The apparatus of this embodiment of the invention does not require a heavy, expensive structural plenum to supply coolant and does not require cast or sintered high temperature metal parts, in contrast to known devices and methods using ceramic foam bonded to a structural plenum. Additionally, much more even cooling of the interface is achieved than is the case for film cooling because the coolant is contained inside the apparatus instead of blown into the free stream.

An analysis of the combined thermal protection and surface temperature control apparatus of the embodiment shown in FIGS. 7-9 was conducted assuming the plugs were Aremco's CERAMABOND 690 boron nitride (BN) adhesive. The hot flow was at 815° (degrees) F (Fahrenheit) and at a Mach number of 1.2. The coolant temperature was 10° F. The underlying structure was kept below 111° F. while the maximum hot surface temperature was 450° F. This level of thermal protection and surface temperature was achieved with approximately 90% less coolant than would have been required with film cooling.

In a further aspect of the invention, there is provided a thermally protected, controlled surface temperature apparatus. The apparatus comprises a member requiring thermal protection. The apparatus farther comprises a porous member comprising an attachment side, a separate entrance side, and a separate exit side. The attachment side of the porous member is attached to the member, and the porous member has a plurality of thermally conductive plugs disposed in the porous member. The apparatus further comprises one or more coolant entrance channels extending through the entrance side, extending part-way through the porous member, and ending within the porous member before reaching said exit side. The apparatus further comprises one or more coolant exit channels beginning within the porous member, extending through a portion of the porous member, and extending through the exit side. It should be noted that the particulars relating to the embodiment of the invention, as described above and in relation to the FIGS. 7-9, apply with equal force to the particulars of this embodiment of the invention.

In a further aspect of the invention, there is provided a method of manufacturing a thermal protection, controlled surface temperature apparatus. The method comprises the step of providing a porous member having a plurality of thermally conductive plugs disposed in the porous member. The method further comprises the step of manufacturing coolant entrance and exit channels within the porous member, where the coolant entrance channel only extends through one side of the porous member and the coolant exit channel only extends through another side of the porous member. It should be noted that the particulars relating to the embodiment of the invention, as described above and in relation to the FIGS. 7-9, apply with equal force to the particulars of this embodiment of the invention.

The preceding discussion assumes the erosion coating completely or nearly completely seals the coolant inside the foam. Another facet of this invention is that the erosion coating could be made semi-permeable either by tailoring the permeability of the coating itself or by perforating it with small holes, or by doing both in combination. This would allow a surface to be controlled to even lower temperatures than is possible when all of the coolant is confined in the foam by an impermeable erosion coating. Regardless of the path taken by the coolant at the erosion coating, one of the advantages of the invention derives from the low pressure drop coolant transport which may be provided by the use of machined channels. This low pressure drop transport may make the distribution of coolant in quantities necessary for surface temperature control over a large area practical in a system that uses the foam as a plenum, eliminating the need for a separate plenum.

Figure 5:
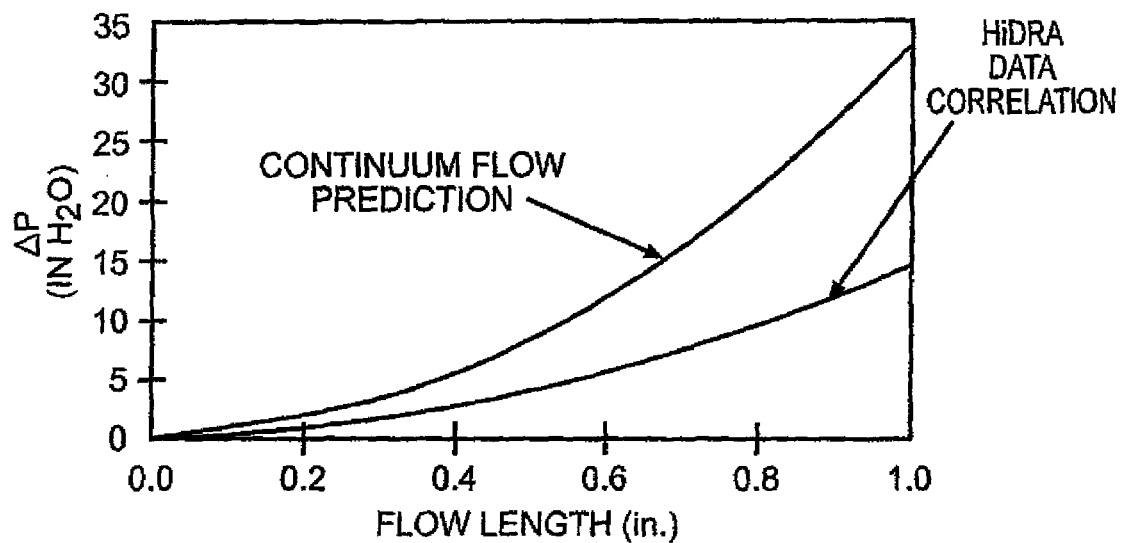
FIG. 5 is a graph comparing pressure differentials at various flow lengths for BRI foam, which may be used under embodiments of the invention.

The small, 35 micron pores found in BRI may cause rarefaction of the flow through the material which may reduce pressure drop. Rarefaction may occur because the flow channel size approaches the mean free path of the individual air molecules in the coolant flow. This means that the flow may no longer be considered as a continuum and instead may be considered in terms of the path of individual particles through a channel. Rarefaction may ultimately result in a non-zero "slip" velocity at the walls bounding a channel and an attendant reduction in pressure drop for the flow, compared to what would be expected for continuum flow and a "no-slip" boundary. This behavior was seen in testing of BRI, as shown in FIG. 5.

Figure 6:
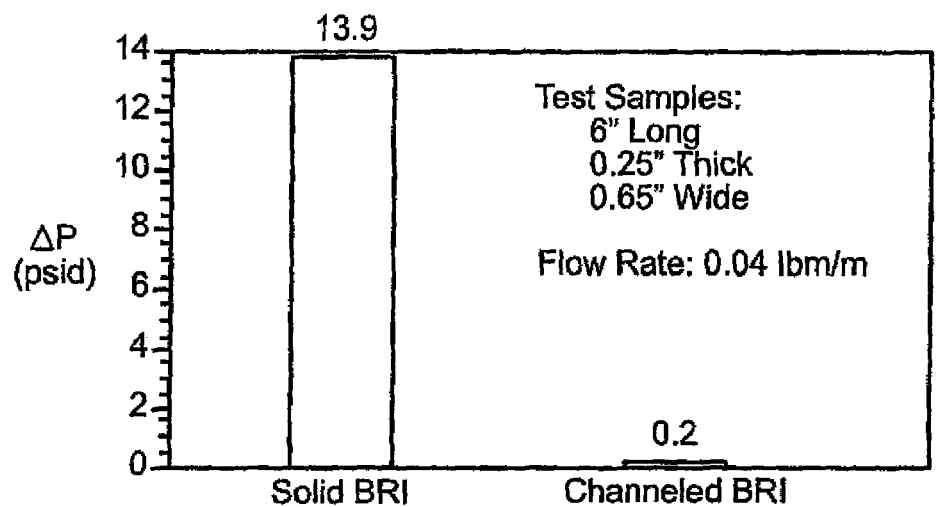
FIG. 6 depicts pressure drop testing results for one embodiment of the invention.

The slip flow produced by rarefaction in the BRI may reduce the pressure drop by 20% to 50% compared to what may be expected under the continuum flow assumption. Furthermore, as the plot indicates, decreasing the length the coolant flows through the foam may dramatically decrease pressure drop. The channeled foam used in one embodiment of the invention makes use of this fact to reduce the coolant pressure drop, compared to one type of conventional system where coolant must flow from entrance to exit longitudinally through a solid foam slab that has no channels. The low pressure drop characteristic of one embodiment of the invention was verified via testing as indicated in FIG. 6. The pressure drop through the channeled BRI was a factor of 70 lower than that of a solid BRI slab with no channels. Therefore, for applications where coolant must be provided to a long distance from the coolant supply plenum (generally on the order of several feet) adequate surface temperature control and thermal protection may be achieved by incorporating the arrangement of machined cooling channels of this invention.

Testing has also shown that the invention may produce uniform cooling of the BRI foam, minimizing hot spots. With this channel arrangement, cooling lengths within the foam may be tailored to meet pressure and surface temperature requirements for a given application.

Minimizing the distance between coolant channels may not only reduce coolant pressure drop, but may also reduce the impact surface damage has on the thermal performance of the TPS (thermal protection system). As previously mentioned, an erosion coating may be applied to the outside surface of the foam to protect the foam from the surrounding environment. In the absence of coolant channels, surface damage to the erosion coating may result in a catastrophic loss of cooling air due to the high coolant pressure drop of such a system. Rather than continuing to flow within the foam, the coolant may escape through the region of the foam experiencing the damage. However, with closely spaced cooling channels, little or no cooling air loss may occur since the pressure drop associated with flowing out the damaged region may be greater than the pressure drop experienced flowing between channels.

The unique combination of thermal protection of underlying structure and surface temperature control characteristic of one or more embodiments of the invention may result in several advantages including structural weight reduction due to the elimination of heavy cooling plenum liners and the use of a lightweight polymer composite as a wall material, cost savings due to the elimination of expensive, high temperature structures, performance increases due to the reduction of the coolant required to control surface temperature thereby allowing the coolant to be utilized for other purposes (such as higher air vehicle thrust), and/or other types of advantages.

It should be understood, of course, that the foregoing relates to exemplary embodiments of the invention and that modifications may be made without departing from the spirit and scope of the invention as set forth in the following claims. Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A combined thermal protection and surface temperature control apparatus comprising:
   a porous member comprising an entrance side, and a separate exit side, wherein said porous member has a plurality of thermally conductive plugs disposed in said porous member;
   one or more coolant entrance channels extending through said and further entrance side, extending through said porous member, towards said exit side and ending within said porous member before reaching said exit side; and
   one or more coolant exit channels beginning within said porous member, and extending through said porous member, towards said exit side and extending through said exit side,
   wherein said thermally conductive plugs extend part-way through said porous member from a top side of said porous member to a portion of a thickness of said porous member, said thermally conductive plugs having bottom surfaces ending at a depth equal to bottom ends of said coolant entrance channels and said coolant exit channels.

2. The apparatus of claim 1, wherein said porous member comprises a porous foam.

3. The apparatus of claim 2, wherein said porous foam comprises a high porosity foam with microchannel pore sizes.

4. The apparatus of claim 3, wherein said foam is a hyperporous, microchannel, alumina silica foam.

5. The apparatus of claim 1, wherein said foam is an alumina silica foam.

6. The apparatus of claim 1, wherein said conductive plugs are formed from a material selected from the group consisting of boron nitride, aluminum nitride, and alumina.

7. The apparatus of claim 1, wherein said conductive plugs have top ends that are in thermal communication with a top erosion coating.

8. The apparatus of claim 1, wherein there are a plurality of coolant entrance channels and a plurality of coolant exit channels.

9. The apparatus of claim 8, wherein said plurality of coolant entrance and exit channels are parallel and alternate.

10. The apparatus of claim 1, wherein said apparatus is adapted to be attached to a thermally protected member.

11. The apparatus of claim 10, wherein said thermally protected member comprises a portion of at least one of an engine, a vehicle, an aircraft, and a spacecraft.

12. The apparatus of claim 1, wherein the top side of said porous member is coated with an erosion coating.

13. The apparatus of claim 1, wherein a coolant flows through said coolant entrance and exit channels, said coolant comprising at least one of a gas and a fluid.

14. The apparatus of claim 1, wherein at least one of a height dimension of said entrance and exit channels, a spacing distance between said entrance and exit channels, and another spacing distance between said entrance and exit channels and a surface of said porous member, is pre-determined based on the amount of thermal protection and surface temperature control required.

15. The apparatus of claim 1, wherein a plurality of combined thermal protection and surface temperature control apparatus are attached together.

16. The apparatus of claim 15, wherein said plurality of combined thermal protection and surface temperature control apparatus are bonded together.

17. A thermally protected, controlled surface temperature apparatus comprising:
a member requiring thermal protection;
a porous member comprising an attachment side, a separate entrance side, and a separate exit side, wherein said attachment side of said porous member is attached to said member, and further wherein said porous member has a plurality of thermally conductive plugs disposed in said porous member;
one or more coolant entrance channels extending through said entrance side, and further extending through said porous member, towards said exit side and ending within said porous member before reaching said exit side; and
one or more coolant exit channels beginning within said porous member, and extending through of said porous member, towards said exit side and extending through said exit side,
wherein said thermally conductive plugs extend part-way through said porous member from a top side of said porous member to a portion of a thickness of said porous member, said thermally conductive plugs having bottom ends ending at a depth equal to bottom surfaces of said coolant entrance channels and said coolant exit channels.

18. The apparatus of claim 17, wherein said conductive plugs are formed from a material selected from the group consisting of boron nitride, aluminum nitride, and alumina.

19. The apparatus of claim 17, wherein the top side of said porous member is coated with an erosion coating, and said conductive plugs have top ends that are in thermal communication with said erosion coating.

20. The apparatus of claim 17, wherein said member is a portion of at least one of an engine, a vehicle, an aircraft, and a spacecraft.

21. The apparatus of claim 17, wherein said porous member comprises a porous foam.

22. The apparatus of claim 21, wherein said foam is of high porosity with microchannel pore sizes.

23. The apparatus of claim 17, wherein said foam is an alumina silica foam.

24. The apparatus of claim 17, wherein said attachment side of said porous member is attached to said member using an adhesive.

25. The apparatus of claim 17, wherein said coolant entrance and exit channels are parallel and alternate with respect to one another.

26. The apparatus of claim 17, wherein at least one of a height dimension of said entrance and exit channels, a spacing distance between said entrance and exit channels, and another spacing distance between said entrance and exit channels and a surface of said porous member, is predetermined based on the amount of thermal protection and surface temperature control required.

27. The apparatus of claim 17, wherein a plurality of porous members are attached together.

28. The apparatus of claim 27, wherein said plurality of porous members are bonded together.

29. A method of manufacturing a thermal protection, controlled surface temperature apparatus comprising:
providing a porous member wherein said porous member has a plurality of thermally conductive plugs disposed in said porous member an entrance side, and an exit side; and
manufacturing coolant entrance and exit channels within said porous member, wherein said coolant entrance channels extend through side entrance side of said porous member towards said exit side and ending within the porous member and said coolant exit channels begin within the porous member and extend through said exit side of said porous member,
wherein said thermally conductive plugs extend part-way through said porous member from a top side of said porous member to a portion of a thickness of said porous member, said thermally conductive plugs having bottom ends ending at a depth equal to bottom ends of said coolant entrance channels and said coolant exit channels.

30. The method of claim 29, wherein said porous member comprises a porous foam.

31. The method of claim 30, wherein said foam is of high porosity with microchannel pore sizes.

32. The method of claim 29, wherein said foam is an alumina silica foam.

33. The method of claim 29, wherein said coolant entrance and exit channels are manufactured to be parallel and alternate with respect to one another.

34. The method of claim 29, further comprising the step of determining a member which requires thermal protection.

35. The method of claim 34, further comprising the step of determining at least one of a height dimension of said entrance and exit channels, a spacing distance between said entrance and exit channels, and another spacing distance between said entrance and exit channels and a surface of said porous member, to provide the amount of thermal protection and surface temperature control required.

36. The method of claim 34, wherein the member comprises a portion of at least one of an engine, a vehicle, an aircraft, and a spacecraft.

37. The method of claim 34, further comprising the step of attaching said porous member to said member.

38. The method of claim 29, wherein said conductive plugs are formed from a material selected from the group consisting of boron nitride, aluminum nitride, and alumina.

39. The method of claim 29, wherein the top side of said porous member is coated with an erosion coating, and said conductive plugs have top ends that are in thermal communication with said erosion coating.

* * * * *